United States Patent
Zhang et al.

(10) Patent No.: US 9,881,112 B1
(45) Date of Patent: Jan. 30, 2018

(54) VECTORLESS DYNAMIC POWER ESTIMATION FOR SEQUENTIAL CIRCUITS

(71) Applicant: Xilinx, Inc., San Jose, CA (US)

(72) Inventors: Fan Zhang, South San Francisco, CA (US); Anup K. Sultania, Sunnyvale, CA (US); Guenter Stenz, Niwot, CO (US)

(73) Assignee: XILINX, INC., San Jose, CA (US)

( * ) Notice: Subject to any disclaimer, the term of this patent is extended or adjusted under 35 U.S.C. 154(b) by 201 days.

(21) Appl. No.: 14/677,868

(22) Filed: Apr. 2, 2015

(51) Int. Cl.
*G06F 17/50* (2006.01)

(52) U.S. Cl.
CPC ................... *G06F 17/505* (2013.01)

(58) Field of Classification Search
CPC ..................................... G06F 17/505
USPC .......................................... 716/109
See application file for complete search history.

(56) References Cited

U.S. PATENT DOCUMENTS

| | | | | |
|---|---|---|---|---|
| 6,807,660 B1 * | 10/2004 | Frenkil | ............... | G06F 17/5022 716/109 |
| 7,877,710 B1 * | 1/2011 | Neto | ................... | G06F 17/5036 716/100 |
| 8,661,381 B1 * | 2/2014 | Malhotra | .............. | G06F 17/505 716/104 |

OTHER PUBLICATIONS

Tsui, C.Y. et al., "Power Estimation Methods for Sequential Logic Circuits", IEEE Transactions on Very Large Scale Integration (VLSI) System, Sep. 1995, pp. 404-416., vol. 3, No. 3, IEEE.

* cited by examiner

*Primary Examiner* — Jack Chiang
*Assistant Examiner* — Brandon Bowers
(74) *Attorney, Agent, or Firm* — Kevin T. Cuenot (57) ABSTRACT

Vectorless dynamic power estimation for a circuit design may include forming, using a processor, a complex basic element within the circuit design, determining, using the processor, initial toggle rates for basic elements within the circuit design, and determining, using the processor, an initial toggle rate for the complex basic element. Vectorless dynamic power estimation further may include generating, using the processor, final toggle rates by updating the initial toggle rates according to a control signal analysis and calculating, using the processor, dynamic power dissipation for the circuit design using the final toggle rates.

20 Claims, 6 Drawing Sheets

VECTORLESS DYNAMIC POWER ESTIMATION FOR SEQUENTIAL CIRCUITS

FIELD OF THE INVENTION

This disclosure relates to electronic circuits and, more particularly, to vectorless dynamic power estimation for a sequential circuit.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to, these devices and further may encompass devices that are only partially programmable. For example, one type of programmable IC includes a combination of hard-coded transistor logic and a programmable switch fabric that programmably interconnects the hard-coded transistor logic.

Within ICs, including the various programmable ICs noted above, a variety of different types of power dissipation contribute to overall power dissipation of the device. Dynamic power dissipation, static power dissipation, and clock power dissipation are all aspects or parts of overall power dissipation of a device. Dynamic power dissipation refers to the amount of power that is dissipated by nodes of a circuit or device as the output of the nodes transitions from one stable state to another stable state. Dynamic power dissipation ($P_{dyn}$) of a node may be calculated as $P_{dyn}=CV^2f$, where C is the capacitance of the node, V is the power supply voltage of the node, and f is the toggle (e.g., transition) rate of the node.

Vectorless dynamic power estimation refers to a particular technique for dynamic power analysis where the toggle rate of one or more nodes of the circuit is unknown. Given a known toggle rate as an input to an unknown node, however, a process called "propagation" may be used to determine the toggle rate for the node. The toggle rate of a node refers to the toggle, or transition, rate, of the output of the node. Propagation relies upon probabilities to estimate toggle rates for nodes of the circuit. Having estimated toggle rates for nodes of the circuit, the dynamic power dissipation of the circuit may be calculated as the sum of $P_{dyn}$ for the nodes.

Available techniques for performing vectorless dynamic power estimation suffer from a variety disadvantages. For example, available vectorless dynamic power estimation techniques tend to be less accurate than vector-based dynamic power estimation techniques performed using simulation. Efforts to increase the accuracy of vectorless dynamic power estimation have increased the amount of computational resources, e.g., the amount of memory and/or amount of processor runtime, needed to unacceptably high levels.

SUMMARY

A method includes of vectorless dynamic power estimation for a circuit design may include forming, using a processor, a complex basic element within the circuit design, determining, using the processor, initial toggle rates for basic elements within the circuit design, and determining, using the processor, an initial toggle rate for the complex basic element. The method further may include calculating, using the processor, final toggle rates by updating the initial toggle rates according to a control signal analysis and calculating, using the processor, dynamic power dissipation for the circuit design using the final toggle rates.

A system for vectorless dynamic power estimation includes a processor programmed to initiate executable operations. The executable operations may include forming a complex basic element within the circuit design, determining initial toggle rates for basic elements within the circuit design, and determining an initial toggle rate for the complex basic element. The executable operations further may include calculating final toggle rates by updating the initial toggle rates according to a control signal analysis and calculating dynamic power dissipation for the circuit design using the final toggle rates.

A non-transitory computer-readable medium has instructions stored thereon which, when executed by a processor, perform a method of vectorless dynamic power estimation. The method may include forming a complex basic element within the circuit design, determining initial toggle rates for basic elements within the circuit design, and determining an initial toggle rate for the complex basic element. The method also may include calculating final toggle rates by updating the initial toggle rates according to a control signal analysis and calculating dynamic power dissipation for the circuit design using the final toggle rates.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic circuits and, more particularly, to vectorless dynamic power estimation for a sequential circuit. In accordance with the inventive arrangements described within this disclosure, dynamic power dissipation of a circuit may be estimated using a vectorless approach. The resulting estimation of dynamic power dissipation achieves a higher level of accuracy than conventional vectorless dynamic power estimation techniques. The accuracy of the vectorless dynamic power estimation described within this disclosure may, at least in some cases, approach that of simulation-based dynamic power estimation techniques. This increased accuracy is achieved without increasing computational resource usage to unacceptably high levels.

The inventive arrangements described within this disclosure utilize various processing techniques to accurately estimate dynamic power dissipation. In one aspect, complex basic elements may be formed within a circuit design. The complex basic elements may be used to represent circuit structures that include loops and/or other more complex circuit structures.

The complex basic elements may be processed differently than basic elements within the circuit design. In one aspect, a finite state machine analysis may be applied to complex basic elements that is not utilized for basic elements. The formation and handling of complex basic elements serves to reduce the number of loops within the circuit design that are to be processed during vectorless dynamic power estimation. For conventional electronic design automation (EDA) tools that perform vectorless dynamic power estimation, the presence of loops within circuit designs has been a continued source of error.

Initial toggle rates may be determined for both basic elements and complex basic elements of the circuit design. The initial toggle rates may be determined without using and/or relying upon control signals that may be coupled to the basic elements and/or the complex basic elements. A corrective phase may be implemented where control signal analysis is performed and applied to the initial toggle rates. The corrective phase may generate final toggle rates for the basic elements and the complex basic elements. The final toggle rates for nodes of the circuit design may be used to calculate dynamic power dissipation.

The inventive arrangements described herein may be implemented as a method or process performed by a data processing system. In another aspect, the inventive arrangements may be implemented as a data processing system having a processor. The processor, upon executing program code, performs operations as described herein. In still another aspect, the inventive arrangements may be implemented as a non-transitory computer-readable storage medium storing program code that, when executed, causes a processor and/or a system to perform and/or initiate a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
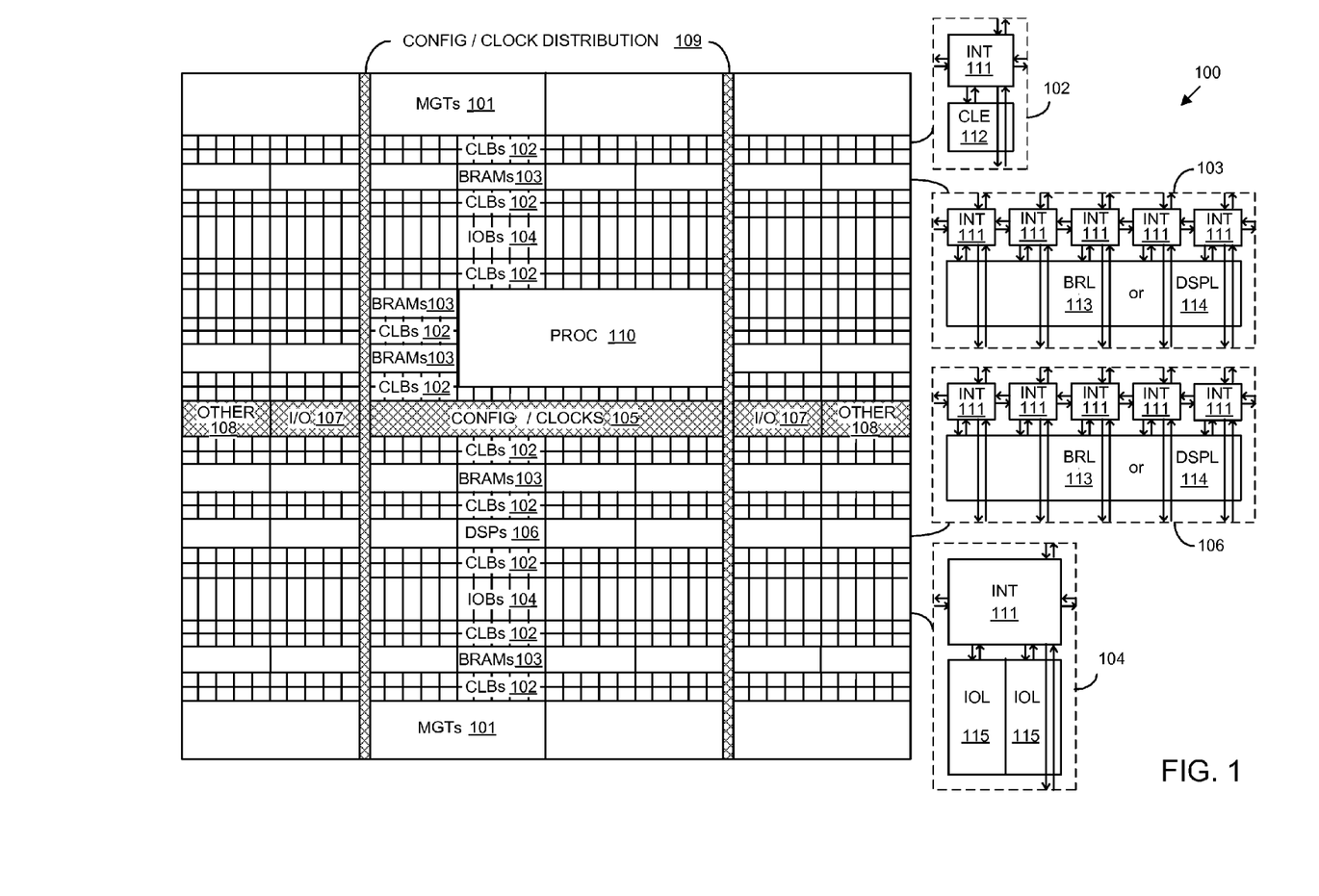
FIG. 1 is a block diagram illustrating an exemplary architecture for an integrated circuit (IC).

FIG. 1 is a block diagram illustrating an exemplary architecture 100 for an integrated circuit (IC). Vectorless dynamic power estimation may be used to estimate the dynamic power dissipation of a circuit design to be implemented within an IC using architecture 100 or another similar architecture.

In one aspect, architecture 100 may be implemented within a programmable IC. For example, architecture 100 may be used to implement a field programmable gate array (FPGA). Architecture 100 may also be representative of a system-on-chip (SOC) type of IC. An SOC is an IC that includes a processor that executes program code and that includes one or more other circuits. The other circuits may be implemented as hardwired circuitry, programmable circuitry, and/or a combination thereof. The circuits may operate cooperatively with one another and/or with the processor.

As shown, architecture 100 includes several different types of programmable circuit, e.g., logic, blocks. For example, architecture 100 may include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 may include a configurable logic element (CLE) 112 that may be programmed to implement user logic plus a single INT 111. A BRAM 103 may include a BRAM logic element (BRL) 113 in addition to one or more INTs 111. Typically, the number of INTs 111 included in a tile depends on the height of the tile. As pictured, a BRAM tile has the same height as five CLBs, but other numbers (e.g., four) also may be used. A DSP tile 106 may include a DSP logic element (DSPL) 114 in addition to an appropriate number of INTs 111. An 10B 104 may include, for example, two instances of an I/O logic element (IOL) 115 in addition to one instance of an INT 111. As will be clear to those of skill in the art, the actual I/O pads connected to IOL 115 may not be confined to the area of IOL 115.

In the example pictured in FIG. 1, a columnar area near the center of the die, e.g., formed of regions 105, 107, and 108, may be used for configuration, clock, and other control logic. Horizontal areas 109 extending from this column may be used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks may be programmable blocks and/or dedicated circuitry. For example, a processor block depicted as PROC 110 spans several columns of CLBs and BRAMs.

In one aspect, PROC 110 may be implemented as dedicated circuitry, e.g., as a hardwired processor, that is fabricated as part of the die that implements the programmable circuitry of the IC. PROC 110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 may be omitted from architecture 100 and replaced with one or more of the other varieties of the programmable blocks described. Further, such blocks may be utilized to form a "soft processor" in that the various blocks of programmable circuitry may be used to form a processor that can execute program code as is the case with PROC 110.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 1 that are external to PROC 110 such as CLBs 102 and BRAMs 103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 110 or a soft processor. In some cases, architecture 100 includes a dedicated configuration processor that loads the configuration bitstream to the appropriate configuration memory and/or processor memory. The dedicated configuration processor does not execute user-specified program code. In other cases, architecture 100 may utilize PROC 110 to receive the configuration bitstream, load the configuration bitstream into appropriate configuration memory, and/or extract program code for execution.

FIG. 1 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 110 within the IC are for purposes of illustration only and are not intended as limitations.

As described, architecture 100 includes a variety of different programmable tiles. In one aspect, different ones of the programmable tiles may be referred to as "basic elements" of architecture 100 or of another similar architecture. Examples of basic elements for a programmable IC may include, but are not limited to, transceivers (e.g., multi-gigabit transceivers or MGTs) and BRAMs. Other examples of basic elements may include a portion of a programmable tile. A CLB is an example of a programmable tile that includes a plurality of basic elements. In illustration, a CLB typically includes a plurality of lookup tables (LUTs) and a plurality of flip-flops. In one example, each LUT may be considered an independent basic element. In another example, each flip-flop may be considered an independent basic element.

A complex basic element is a group of two or more basic elements. A complex basic element includes two or more basic elements coupled in a predefined way and/or having a predefined architecture. In one example, a complex basic element is a group of two or more basic elements where at least two of the basic elements are coupled by a feedback path. In another example, a complex basic element is a group of two or more basic elements where at least two of the basic elements in the group are coupled to one or more same control signals. As defined herein, the term "control signal" means a set signal, a reset signal, an enable signal, or a clear signal.

Figure 2:
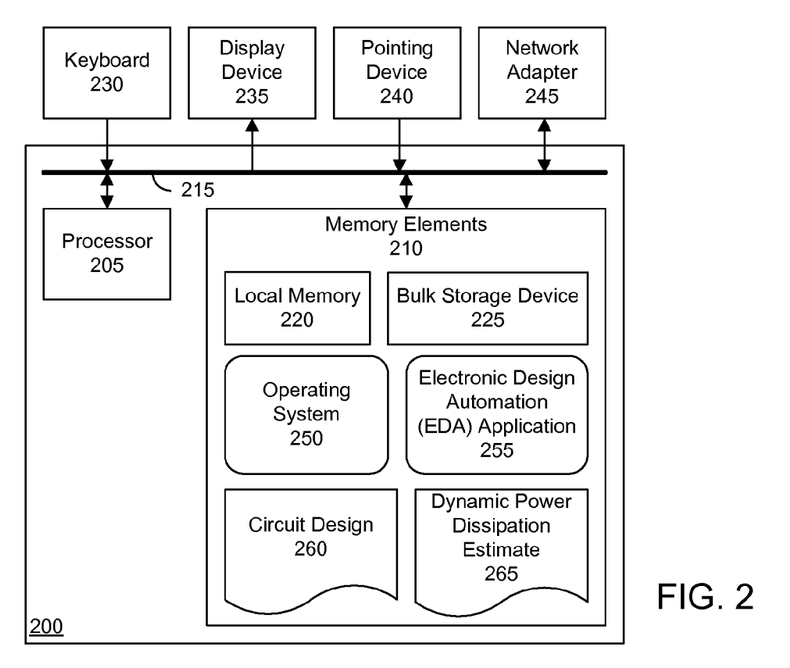
FIG. 2 is a block diagram illustrating an exemplary data processing system.

FIG. 2 is a block diagram illustrating an exemplary data processing system (system) 200. System 200 includes at least one processor 205 coupled to memory elements 210 through a system bus 215 or other suitable circuitry. System 200 stores program code within memory elements 210. Processor 205 executes the program code accessed from memory elements 210 via system bus 215.

Memory elements 210 include one or more physical memory devices such as, for example, a local memory 220 and one or more bulk storage devices 225. Local memory 220 may be implemented as a random access memory (RAM) or other non-persistent memory device(s) generally used during actual execution of the program code. Bulk storage device 225 may be implemented as a hard disk drive (HDD), a solid state drive (SSD), or another persistent data storage device. System 200 also may include one or more cache memories (not shown) that provide temporary storage of at least some program code in order to reduce the number of times program code must be retrieved from bulk storage device 225 during execution.

Input/output (I/O) devices such as a keyboard 230, a display device 235, a pointing device 240, and a network adapter optionally may be coupled to system 200. The I/O devices may be coupled to system 200 either directly or through intervening I/O controllers. In some cases, one or more of the I/O devices may be combined as in the case where a touchscreen is used as display device 235. In that case, display device 235 may also implement keyboard 230 and/or pointing device 240. Network adapter 245 enables system 200 to become coupled to other systems, computer systems, remote printers, and/or remote storage devices through intervening private or public networks. Modems, cable modems, Ethernet cards, wireless transceivers, and/or wireless radios are examples of different types of network adapter 245 that may be used with system 200.

Memory elements 210 may store an operating system 250 and an EDA application 255. In one aspect, EDA application 255 may include one or more different components or modules. EDA application 255, being implemented in the form of executable program code, is executed by system 200. As such, EDA application 255 may be considered an integrated part of system 200. EDA application 255 and any data items used, generated, and/or operated upon by system 200 while executing EDA application 255 may be considered functional data structures that impart functionality when employed as part of system 200.

In one aspect, system 200 may be a computer that is suitable for storing and/or executing program code. System 200 may be any system including a processor and memory that is capable of performing the functions described within this disclosure. System 200 may be implemented as a single system as shown or as a plurality of networked or interconnected systems each having an architecture the same as, or similar to, that of system 200.

In operation, system 200 may execute EDA application 255 in cooperation with operating system 250. System 200 may access a circuit design 260 from memory elements 210 and/or from another data storage device coupled to system 200. Circuit design 260 may be a sequential circuit. A sequential circuit is one that includes circuit elements, e.g., basic elements, where the output depends upon a present value of an input signal to the element and a sequence of past inputs. A sequential circuit element includes a memory element that stores state information used in generating an output.

In one aspect, circuit design 260 has been synthesized. Synthesis is a process where an abstract, programmatic description of a circuit is converted into a low-level design implementation. Synthesis also includes mapping the low-level circuit implementation to circuit elements available on the IC in which the circuit design will be implemented, referred to as the "target IC." Circuit design 260 may have undergone synthesis for implementation within an IC having an architecture as described with reference to FIG. 1, for example.

The abstract, programmatic description of the circuit design may be specified in a hardware description language (HDL). The abstract, programmatic description of the circuit describes behavior of the circuit and is also referred to as a "behavioral description" or a "register transfer level (RTL) description" of the circuit. The low level design implementation generated through synthesis typically is specified as inter-connected logic gates.

As part of synthesis, mapping correlates, or matches, the logic gates of the low-level circuit design to the various types of circuit blocks or resources that are actually available in the target IC. Referring to FIG. 1, for example, the logic gates may be matched to basic elements of the target IC. In illustration, since a LUT may implement a complex function, one or more logic gates of the low level design implementation may be mapped to a single LUT type of basic element. The mapped circuit design is functionally equivalent to the low-level design implementation. Whereas the low-level design implementation is specified as logic gates after the translation, the resulting circuit design after mapping is specified in terms of basic elements of the target IC.

Circuit design 260 need not have undergone placement and/or routing. Thus, circuit design 260 may be synthesized, but not placed and/or routed. System 200, in executing EDA application 255, may perform one or more operations on circuit design 260 to generate dynamic power dissipation estimate 265. In one aspect, system 200 initiates and/or performs one or more operations to be described herein in greater detail that implement a vectorless dynamic power estimation technique resulting in dynamic power dissipation estimate 265.

Figure 3:
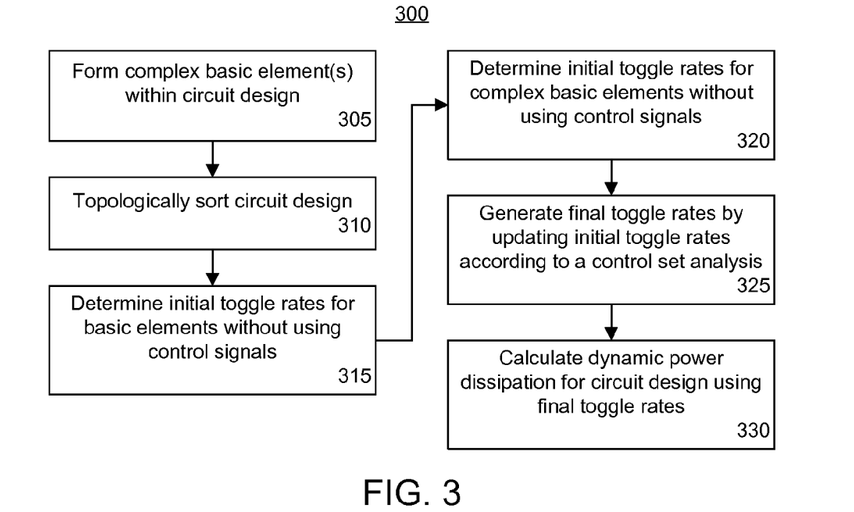
FIG. 3 is a flow chart illustrating an exemplary method of vectorless dynamic power estimation.

FIG. 3 is a flow chart illustrating an exemplary method 300 of vectorless dynamic power estimation. Method 300 may be implemented by a system such as system 200 of FIG. 2. For purposes of discussion, method 300 begins in a state where a synthesized circuit design has been loaded or otherwise made available to the system. The system may begin the process of estimating dynamic power dissipation of the circuit using a vectorless technique.

In block 305, the system forms one or more complex basic elements within the circuit design. As noted, complex basic elements are formed from two or more basic elements of the circuit design. The system analyzes the circuit design and forms complex basic elements from the various basic elements included therein. In one aspect, the system detects a complex basic element as any group of two or more basic elements where at least two of the basic elements are coupled by a feedback path.

In another aspect, the system may detect complex basic elements as any group of two or more basic elements having a predetermined architecture. An example of a predetermined architecture includes two or more basic elements being coupled to one or more same control signals. A synchronizer circuit may be an example of a complex basic element having a predetermined architecture. A synchronizer circuit, for example, may include two serially coupled flip-flops that share one or more same control signals, e.g., a same clock signal.

In block 310, the system may topologically sort the circuit design. The system may sort the basic elements and the complex basic elements of the circuit design in topological order. Complex basic elements are treated as atomic units during the sorting, e.g., as basic elements for purposes of sorting. A topologically sorted order guarantees that if an element A (whether a basic element or a complex basic element) is driving element B, element A will be in front of element B in the topologically sorted circuit design.

In one aspect, the topological sort may be performed using a Depth-First Search (DFS). The DFS search may be used to topologically order the circuit design in order to propagate signal activities. The topological sorting identifies loops within the circuit design and further provides the connections of the loops, e.g., nets, to be broken to make the circuit acyclic. Subsequently, the system may apply a default activity to the broken connections.

In another aspect, leveling may be performed as part of the topological sorting of the circuit design. Leveling ensures that if an element B1 drives an element B2, then the level of B1 is smaller than the level of B2. Each element may be initialized to a level of zero at a start of the leveling process. The system may iterate over all elements in the topological order. For each element B, the fanouts of the element are determined. If a fanout has not yet been traversed by the system, the level of that fanout is adjusted to at least level B+1. Levelization of the elements may be performed to facilitate multi-threading. Elements that share the same level, for example, may be processed independently of one another during propagation by multiple threads in parallel. In block 315, the system determines initial toggle rates for basic elements of the circuit design without accounting for control signals. In block 315, the system determines initial toggle rates for those basic elements of the circuit design that are not part of complex basic elements formed in block 310. As defined herein, the term "initial toggle rate" means an estimated toggle rate determined using a vectorless propagation technique where control signals are not used in the determination.

In one aspect, as part of determining initial toggle rates, the system may perform propagation. Propagation is a technique used in vectorless dynamic power estimation where switching activities are determined for nodes of the circuit design. Propagation begins at nodes where the switching activity is known and moves to other nodes where switching toggle rate is unknown. A node where the toggle rate is unknown may be referred to as an "unknown node." Propagation may be performed in the topological order.

As noted, the system may begin with nodes where the toggle rate is known. The system progresses to a node, e.g., a basic element, where the toggle rate is unknown. Each basic element has a known propagation algorithm that may be used to determine the initial toggle rate of that basic element. For example, a flip-flop type of basic element has a propagation algorithm that may be used to determine or express the initial toggle rate of the output of the flip-flop. The algorithm may express the initial toggle rate of the flip-flop in terms of a known toggle rate of an input signal provided to the flip-flop. Similarly, a LUT will have a propagation algorithm. In the case of a LUT, for example, the propagation algorithm will depend upon the particular logic functions implemented by the LUT.

The system calculates the initial toggle rate of the basic element without using control signals and assigns the initial toggle rate thereto. For example, the system may consider control signals provided to basic elements as being disconnected from the basic elements, or being removed, for purposes of determining the initial toggle rate. The system then continues to the next basic element(s) of the topologically ordered circuit design until a primary output of the circuit design is reached. When one assumes that the propagation algorithm for a basic element without a feedback path is exact, the resulting toggle rate for the output of the basic element may be assumed to be exact.

In block 320, the system determines initial toggle rates for complex basic elements of the circuit design. As noted, the initial toggle rates are determined without using, or accounting for, control signals provided to the basic elements that are members of the complex basic elements. For example, the system may consider control signals provided to basic elements that are members of a complex basic element as being disconnected from the basic elements, or being removed, for purposes of determining the initial toggle rate. In one aspect, the initial toggle rate for the complex basic element may be determined using a finite state machine analysis. It should be appreciated that initial toggle rates, whether determined or basic elements or complex basic elements, are not dependent upon control signals of the circuit design.

In block 325, the system generates final toggle rates by updating the initial toggle rates according to a control signal analysis. The system may update, or adjust, initial toggle rates of basic elements not included in complex basic elements and initial toggle rates of complex basic elements. In one aspect, control signal analysis may include determining a static probability of a control signal for a basic element and/or a complex basic element. The system may calculate a final toggle rate for a basic element and/or a complex basic element by multiplying the static probability of the control signal by the toggle rate of the basic element or complex basic element as the case may be.

In block 330, the system calculates the dynamic power of the circuit design using the final toggle rates. The system may calculate the dynamic power dissipation ($P_{dyn}$) of each basic element used in the circuit design using the expression $P_{dyn}=CV^2 f$, where C is the capacitance of the element, V is the power supply voltage of the element, and f is the toggle (e.g., transition) rate of the element. The dynamic power dissipation of each basic element, including those basic elements that are part of complex basic elements, is summed. The system may calculate the dynamic power dissipation of the circuit design by summing the dynamic power dissipation of basic elements. It should be appreciated that having determined final toggle rates for the various elements of the circuit design, the complex basic element structures are no longer needed. As such, calculating dynamic power of the circuit design may be performed by calculating $P_{dyn}$ for each basic element of the circuit design regardless of prior membership of the basic element in a complex basic element and summing the $P_{dyn}$ of the basic elements.

Figure 4:
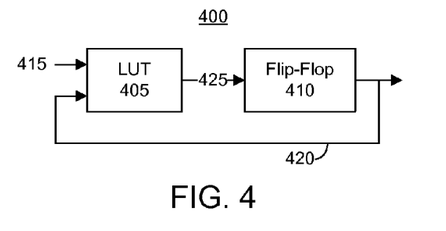
FIG. 4 is a block diagram illustrating an example of a complex basic element.

FIG. 4 is a block diagram illustrating an example of a complex basic element 400. Complex basic element 400 includes a LUT 405 coupled to a flip-flop 410. LUT 405 and flip-flop 410 each are basic elements. LUT 405 receives an input signal 415 and a signal 420. As pictured, signal 420 is the signal output from flip-flop 410. Signal 420 is the feedback path previously described as a characteristic of particular types of complex basic elements. LUT 405 outputs a signal 425 to an input of flip-flop 410. For purposes of discussion, the signal representing the feedback path of a complex basic element may be referred to as the "state line signal."

As part of block 310 of FIG. 3, the system may detect instances of basic elements having the architecture pictured in FIG. 4. For example, responsive to detecting LUT 405 and flip-flop 410 in the configuration shown, the system forms complex basic element 400 within the circuit design using the two basic elements. By forming complex basic elements such as complex basic element 400, the system is able to better define the boundary of signal propagation within the circuit design. The boundary of signal propagation for complex basic element 400, for example, is defined by signal 415 at the input and by signal 420 at the output.

Conventional techniques for performing vectorless dynamic power estimation attempt to break up loops and rely upon a default toggle rate for the broken net, e.g., the state line signal. This approach, however, may lead to large discrepancies in toggle rates for the loop circuitry. Consider a loop formed of an inverter feeding a flip-flop, with the output of the flip-flop being fed back to the input of the inverter. In theory, the toggle rate of the output of the flip-flop will be 100%. By breaking the state line signal feedback path between the output of the flip-flop and the input of the inverter and using a default toggle rate of 12.5% for the flip-flop, one can see the large discrepancy in toggle rate. This large discrepancy results in inaccurate dynamic power estimations, particularly with circuit designs with larger numbers of loop and/or feedback circuit structures. Forming complex basic elements prior to the sorting, as described within this disclosure, results in fewer broken nodes thereby improving accuracy of the dynamic power dissipation estimation.

Figure 5:
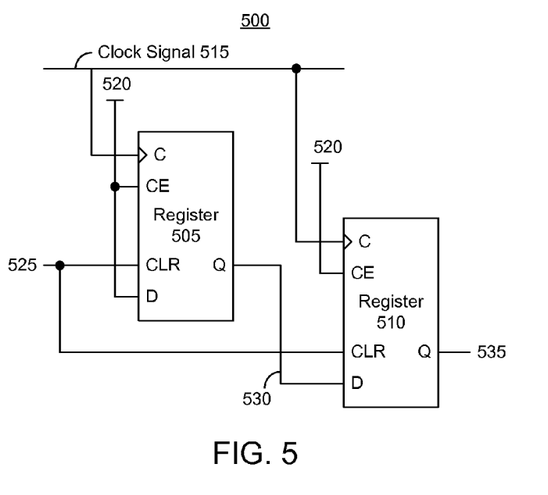
FIG. 5 is a block diagram illustrating another example of a complex basic element.

FIG. 5 is a block diagram illustrating another example of a complex basic element 500. Complex basic element 500 is an exemplary implementation of an asynchronous reset/ synchronous release circuit. As pictured, clock (C) pins of registers 505 and 510 are coupled to clock signal 515. Clock enable (CE) pins of registers 505 and 510 are coupled to signal 520 set to logic high. Data (D) pin of register 505 is also coupled to signal 520. The clear (CLR) pin of registers 505 and 510 is coupled to signal 525. The output pin (Q) of register 505 is coupled to the D pin of register 510 by signal 530. The output of pin (Q) of register 510 generates signal 535.

In another aspect, as part of block 310 of FIG. 3, the system may detect instances of basic elements, e.g., registers 505 and 510, within the topologically sorted circuit design arranged as shown in FIG. 5. Responsive to detecting the basic elements, the system may form complex basic element 500 within the topologically sorted circuit design.

It should be appreciated that complex basic elements 400 and 500 are presented for purposes of illustration and not limitation. In another aspect, a complex basic element may include two or more basic elements that share one or more same, or common, control signals. In still another aspect, a complex basic element may be a circuit structure that is found to be used extensively within circuit designs for implementation within programmable ICs as described within this disclosure. For example, a library of complex basic elements may be maintained. The system may analyze the circuit design and attempt to match groups of basic elements to the library of complex basic elements. Responsive to determining a match, the system forms a complex basic element within the circuit design from the group of matching basic elements.

Figure 6:
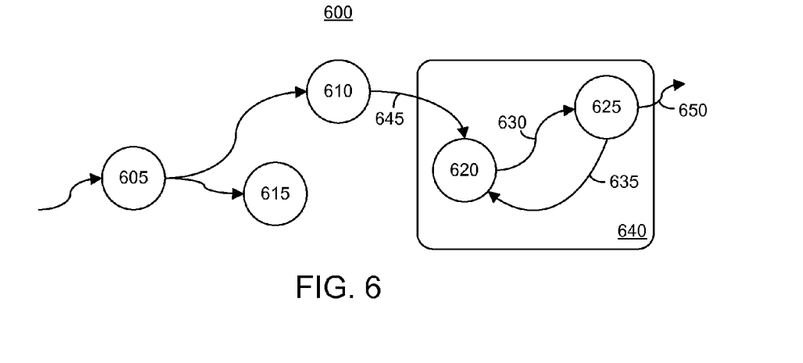
FIG. 6 is a graph illustrating an example of topological sorting and formation of complex basic elements in a circuit design.

FIG. 6 is a graph 600 illustrating an example of topological sorting and formation of complex basic elements in a circuit design. Graph 600 includes nodes 605, 610, 615, 620, and 625 each representing a basic element of the circuit design. The arrows connecting the nodes represent signals. As pictured, nodes 605-625 are arranged in topological order as the signals generally flow from left to right.

In the pictured example, node 620 is coupled to node 625 by a signal path 630. The system may detect signal 635 coupling nodes 620 and 625, where signal 635 is identified as a feedback path. As illustrated, signal 635 is directed from right to left. In general, with basic elements sorted topologically, the system may determine that a feedback path exists responsive to determining that a basic element is coupled to more than two signals. In this example, node 620 has two signals entering and one signal leaving. Node 625 has two signals leaving and one signal entering. In another aspect, a feedback path may be recognized responsive to determining that a path, or signal, exists between state bits (e.g., state line signals) of sequential circuits and a combinatorial input of the same sequential circuits. The existence of a feedback path in sequential circuits often implies temporal correlation. Temporal correlation has been a source of inaccuracy for conventional toggle rate estimation.

Responsive to detecting signal 635 as a feedback path, the system forms a complex basic element 640 including the basic elements represented by nodes 620 and 625. The system forms complex basic element 640 from the two basic elements coupled to one another by two or more signals.

Subsequent to formation, complex basic element 640 has a single input, i.e., signal path 645, and a single output, i.e., signal path 650. The loop between nodes 620 and 625 is effectively eliminated since complex basic element 640 is evaluated independently of other basic elements, e.g., nodes 605, 610, and/or 615, of the circuit design. As discussed, the system may analyze complex basic element 640 using finite state machine analysis.

The formation of complex basic elements illustrated in FIGS. 4-6 and the finite state machine analysis performed upon complex basic elements is one technique for accounting for temporal correlation in sequential circuits. In general, temporal correlation within a circuit may be used as a measure of similarity of a particular signal over time. Temporal correlation means that a relationship exists between the value of a signal at a time T and the value of the same signal at a time T+1.

Figure 7:
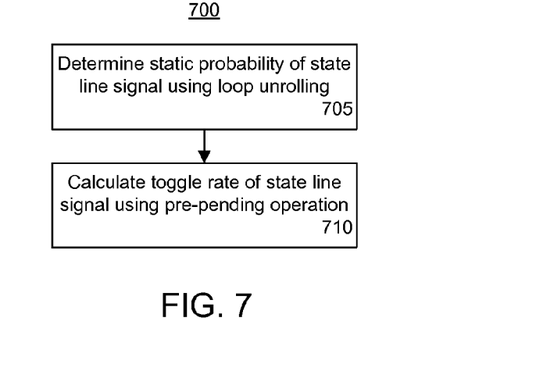
FIG. 7 is a flow chart illustrating an exemplary method of determining initial toggle rates for complex basic elements.

FIG. 7 is a flow chart illustrating an exemplary method 700 of determining initial toggle rates for complex basic elements. Method 700, for example, may be used to implement block 320 of FIG. 3. Within FIG. 7, and as noted with reference to block 320 of FIG. 3, control signals are not used to determine initial toggle rates. The system, for example, may exclude controls signals from the determination of initial toggle rates, whether for basic elements or for complex basic elements.

In block 705, the system determines a static probability of the state line signal. The system may determine the static probability of the state line signal using loop unrolling. As noted, the state line signal is the signal that is fed back as the feedback path. With reference to FIG. 4, for example, the state line signal is signal 420. The system may unroll the loop within the complex basic element until the static probability of the state line signal converges to a value.

In block 710, the system determines a toggle rate of the state line signal using a pre-pending operation. The initial toggle rate of the state line signal may be calculated using the static probability of the state line signal and may be determined by implementing the prepending operation. Having determined an initial toggle rate of the state line signal of the complex basic element, initial toggle rates for other basic elements of the complex basic element may be determined. The determination of initial toggle rates for a complex basic element is described in greater detail with reference to FIGS. 8 and 9 below.

In one aspect, the pre-pending operation may be performed one or more times. In general, the higher the number of iterations of the pre-pending operation, the more accurate the result. More iterations of the pre-pending operation, however, may consume too many computing resources, e.g., processor runtime and/or memory usage. As such, in one aspect, the pre-pending operation may be performed a single time.

Figure 8:
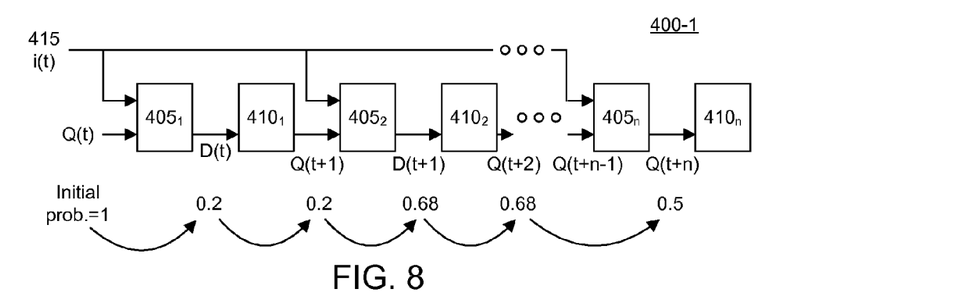
FIG. 8 is a block diagram illustrating a technique for determining a static probability of a state line signal using loop unrolling.

FIG. 8 is a block diagram illustrating an exemplary technique for determining a static probability of a state line signal using loop unrolling. For purposes of illustration, complex basic element 400 of FIG. 4 is used. Further, LUT 405, in this example, implements an exclusive OR (XOR) circuit. In the example of FIG. 8, complex basic element 400 is unrolled n−1 times resulting in complex basic element 400-1. Within FIG. 8, signal 415, being an input signal, may be expressed as "i" and as a function of time as "i(t)." Because complex basic element 400 is unrolled, the feedback path, i.e., signal 420, is broken and carried forward. Signal 420 is depicted as a function of time as signal Q(t).

Initially, the static probability of Q(t) may be assumed to be 100% or 1. The static probability of i(t) may be known to be 80% or 0.8. The static probability of D(t), which may be represented as Prob(D(t)), may be defined as a function of the static probability of signals i(t) and Q(t) and the function implemented by basic element 405. For purposes of discussion, basic element 405 may implement an exclusive OR gate. Thus, the static probability of D(t) may be expressed as Prob(D(t))=Prob[i(t) XOR Q(t)]=0.2.

As pictured in FIG. 8, D(t), as output from basic element $405_1$, is equal to Q(t+1), as output from basic element $410_1$. The calculation may be iterated with continued unrolling of the loop until Prob(D(t)) converges to a value of 50%, or 0.5, in this case. In one exemplary implementation, the system may utilize a Binary Decision Diagram (BDD) to solve for Prob(D(t)).

Figure 9:
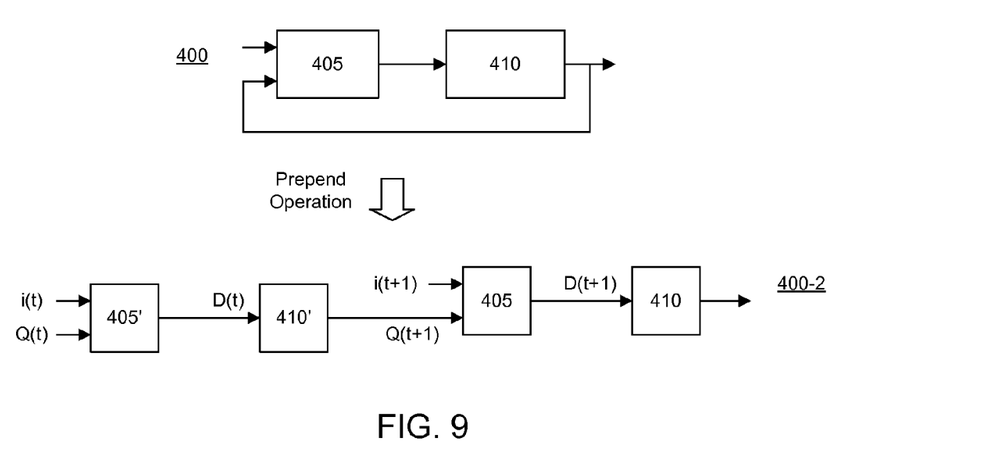
FIG. 9 is a block diagram illustrating an exemplary technique for determining a toggle rate of a state line signal using a pre-pending operation.

FIG. 9 is a block diagram illustrating an exemplary technique for determining a toggle rate of a state line signal using a pre-pending operation. FIG. 9 continues using complex basic element 400 for purposes of illustration where basic element 405 (e.g., LUT 405) implements an exclusive OR circuit. As pictured, a pre-pending operation is performed on complex basic element 400. The system begins with complex element 400 as shown and duplicates the structure of complex basic element 400 without the feedback path (e.g., with the feedback path broken) resulting in pre-pended version of complex basic element 400-2. The system generates a duplicate LUT 405 shown as 405' and a duplicate of flip-flop 410 shown as 410'. LUT 405' and flip-flop 410' are placed in front of existing LUT 405.

For complex basic element 400, which includes an exclusive OR (as implemented by LUT 405) and flip-flop feedback loop, the toggle rate may be determined as the probability of D in the current time step being different from D in the next time step. In the current time step, D(t)=i(t) XOR Q(t). In the next time step, D(t+1)=i(t+1) XOR Q(t+1). Given the current time step and the next time step expressions, the toggle rate may defined as shown below.

$$\text{Toggle Rate}=\text{Prob}[D(t) \text{XOR } D(t+1)]$$

$$=\text{Prob}[(i(t) \text{XOR } Q(t) \text{XOR}(i(t+1) \text{XOR } Q(t+1))]$$

Within the above expression for toggle rate, the transition probability of the state bit signal (Q) is unknown. From the pre-pending operation, one can observe that D(t) is equal to Q(t+1). Referring to FIG. 9, for example, basic element 410', being a flip-flop, will transition each time that D(t) transitions. Accordingly, within the above expression for toggle rate, the term Q(t+1) may be substituted with D(t). As noted, D(t)=Q(t) XOR i(t). Toggle rate may be rewritten as shown below.

$$\text{Toggle Rate}=\text{Prob}[(i(t) \text{XOR } Q(t) \text{XOR}(i(t+1) \text{XOR } Q(t+1))]$$

$$=\text{Prob}[i(t) \text{XOR } Q(t) \text{XOR}(i(t+1) \text{XOR}(Q(t) \text{XOR } i(t)))]$$

From the analysis illustrated in FIG. 8, the static probability of Q(t) was determined to be 0.5. The static probability of i(t)=i(t+1)=0.8. Given these values, the toggle rate of the state line signal may be determined.

In one aspect, BDD may be used to determine the toggle rate. Using BDD, the potential exists to dramatically increase runtime and memory usage due to the potential of creating many nodes for BDD. Excessive runtime and memory usage may be mitigated by limiting the pre-pending operation to a single iteration.

It should be appreciated that the initial toggle rate of the state line signal may be used with other known signal toggle rates of signals to determine initial toggle rates of other basic elements of the complex basic element. Referring to FIG. 4, for example, once the initial toggle rate of signal 420 is determined as described with reference to FIGS. 7-9, the initial toggle rate of signal 425 may be determined as toggle rates of both input signals are known and the function of LUT 405 is known.

Figure 10:
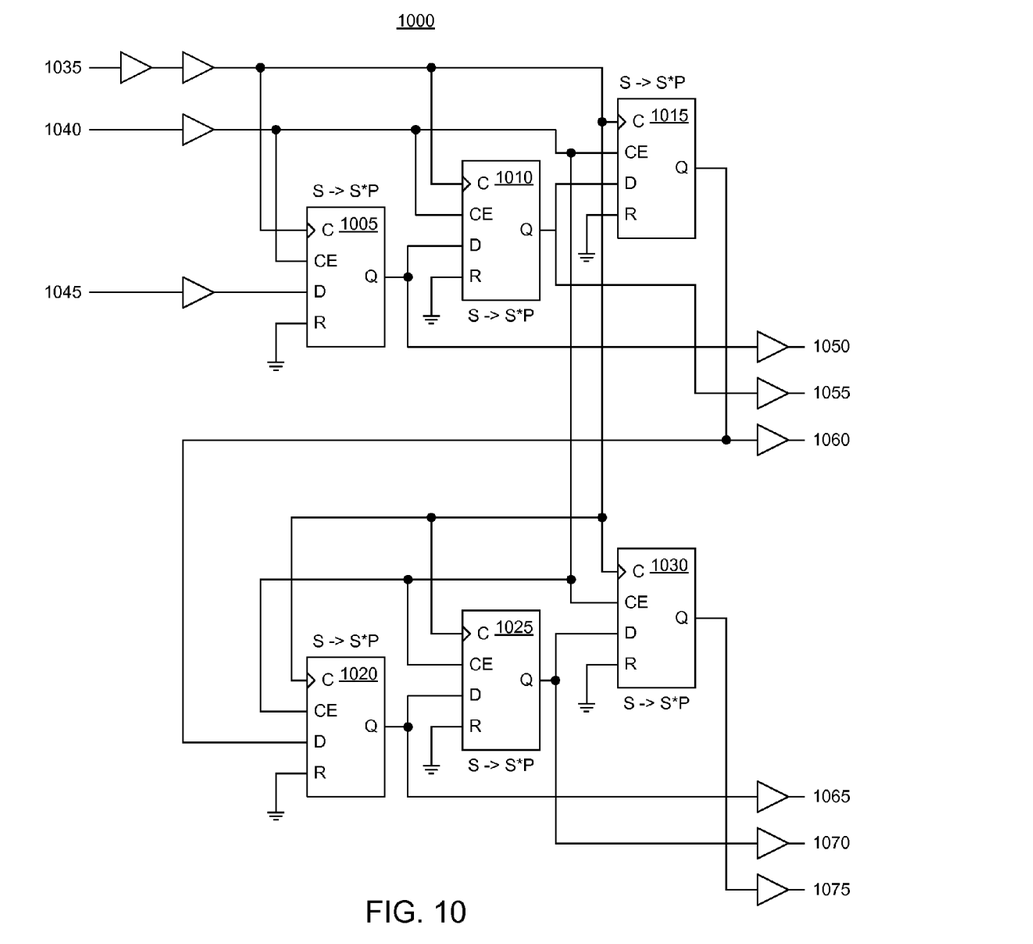
FIG. 10 is a block diagram illustrating an exemplary correction technique using control signal analysis.

FIG. 10 is a block diagram illustrating an exemplary update process using control signal analysis. The update process illustrated in FIG. 10 may be used to implement block 325 of FIG. 3. In one aspect, the update process may be viewed as a corrective action that addresses inaccuracy without considering control signals.

Control signal analysis, or CSA, is a technique that accounts for spatial correlation in sequential circuits. The initial toggle rates determined for basic elements, including those that are part of complex basic elements, as discussed, do not account for control signals. FIG. 10 illustrates an example of how a control signal analysis may be performed and the results applied to the initial toggle rates previously determined.

Referring to FIG. 10, circuit 1000 illustrates a pipelined circuit architecture including flip-flops 1005, 1010, 1015, 1020, 1025, and 1030. Each of flip-flops 1005-1030 shares a common enable signal 1040 and a common clock signal 1035. As pictured signal 1040 is coupled to the CE pin of each of flip-flops 1005-1030. Signal 1035 is coupled to the C pin of each of flip-flops 1005-1030. Flip-flop 1005 receives signal 1045 as an input data signal at pin D.

The output pin Q of flip-flop 1005 is coupled to pin D of flip-flop 1010 and is provided as output signal 1050. The output pin Q of flip-flop 1010 is coupled to pin D of flip-flop 1015 and is provided as output signal 1055. The output pin Q of flip-flop 1015 is coupled to pin D of flip-flop 1020 and is provided as output signal 1060. The output pin Q of flip-flop 1020 is coupled to pin D of flip-flop 1025 and is provided as output signal 1065. The output pin Q of flip-flop 1025 is coupled to pin D of flip-flop 1030 and is provided as output signal 1070. The output pin Q of flip-flop 1030 is provided as output signal 1075.

In FIG. 10, flip-flops 1005-1030 may be sorted in order from primary input to primary output, e.g., from flip-flop 1005 (signal 1050), to flip-flop 1010 (signal 1055), to flip-flop 1015 (signal 1060), to flip-flop 1020 (signal 1065), to flip-flop 1025 (signal 1070), to flip-flop 1030 (signal 1075). Circuit 1000 provides a clear illustration of control signal analysis since no combinatorial logic exists between flip-flops 1005-1030. Without combinatorial logic between the flip-flops, the system does not need to propagate combinatorial outputs. In the example of FIG. 10, signal 1045 has a toggle rate of "S." After performing the propagation described with reference to block 310, for example, each flip-flop 1005-1030 has a same toggle rate of "S" with control signals being excluded from the analysis.

The system, as part of performing control signal analysis, determines the static probability of the common control signal, which is signal 1040 (the enable signal) in this example. The static probability of signal 1040 is represented as "P." As part of the corrective action, the system modulates, or multiplies, the toggle rate "S" of each of flip-flops 1005-1030 by a factor "P" that is derived from the static probability of signal 1040 and the toggle rate of signal 1040. For example, the static probability of signal 1040 and the toggle rate of signal 1040 may be multiplied. The result of the modulation by the factor "P" may be used as the final toggle rate. The system changes the final toggle rate of each of flip-flops 1005-1030 from "S" to "S*P" as illustrated in FIG. 10 by the notation S→S*P.

Figure 11:
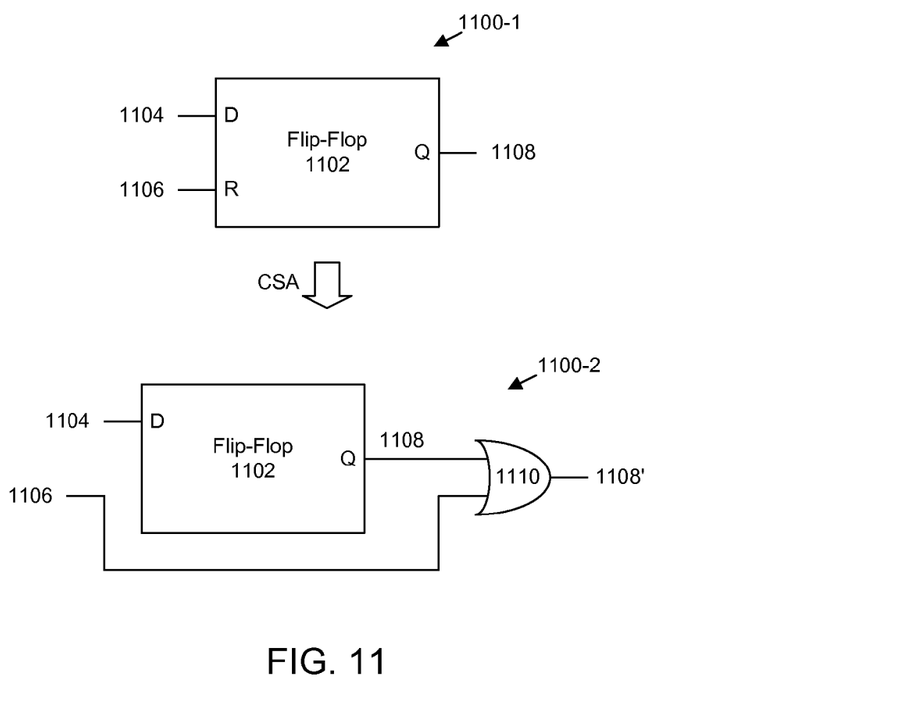
FIG. 11 is a block diagram illustrating another aspect of control signal analysis.

FIG. 11 is a block diagram illustrating another aspect of CSA. FIG. 11 illustrates exemplary processing that may be performed as part of CSA in block 325 of FIG. 3. FIG. 11 illustrates CSA as applied to a basic element of a circuit design.

As pictured, basic element 1100-1 is a flip-flop 1102. Flip-flop 1102 receives signal 1104 at a data pin D and a control signal 1106, e.g., a set type of control signal, at the reset pin R. Flip-flop 1102 generates an output signal 1108 at pin Q. In one aspect, the system may transform basic element 1100-1 into a modified basic element 1100-2 for purposes of CSA.

Within modified complex basic element 1100-2, as part of the analysis, an OR-circuit 1110 is inserted. Further, control signal 1106 bypasses flip-flop 1102 and is provided to an input pin of OR-circuit 1110. A second, or different input pin of OR-circuit 1110 receives output signal 1108 from flip-flop 1102. For purposes of CSA, the final toggle rate of modified complex basic element 1100-2 (which is used for circuit 1100-1) is the final toggle rate of signal 1108' as output from OR-circuit 1110.

It should be appreciated that OR-circuit 1110 is included only for purposes of performing CSA analysis and determining final toggle rates. OR-circuit 1110, for example, does not remain within the circuit design post dynamic power dissipation estimation.

As noted, the final toggle rate for basic element 1100-1 is the toggle rate of 1108'. The final toggle rate of basic element 1100-1 is a function of the static probability of signal 1106, the toggle rate of signal 1106, the probability of signal 1108, and the toggle rate of signal 1108. The final toggle rate of signal 1108 may be expressed as:

Final Toggle Rate=$F$[Prob(set), Toggle_rate(set), Prob($Q$), Toggle_rate($Q$)]

Figure 12:
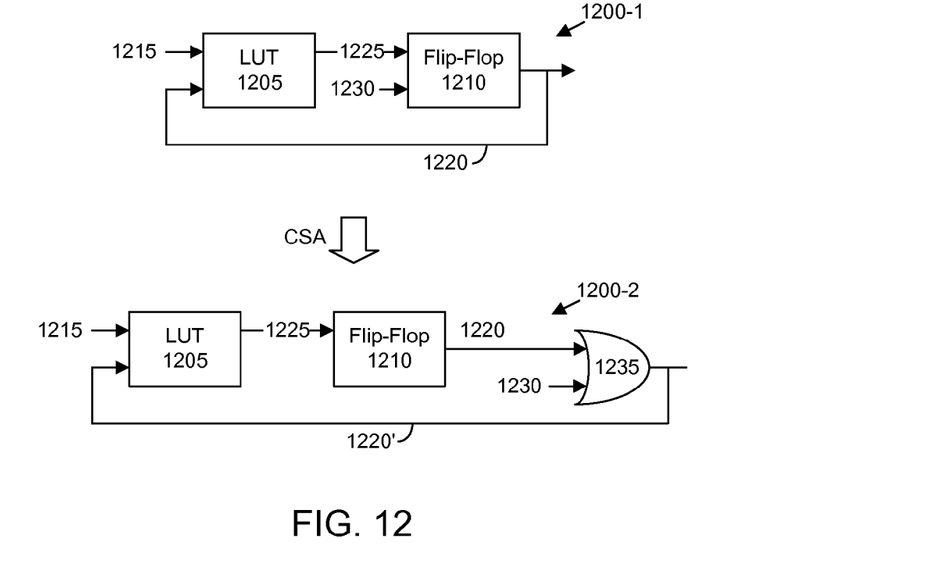
FIG. 12 is a block diagram illustrating another aspect of control signal analysis.

FIG. 12 is a block diagram illustrating another aspect of CSA. FIG. 12 illustrates exemplary processing that may be performed as part of CSA in block 325 of FIG. 3. For example, FIG. 12 illustrates CSA as applied to a complex basic element. Complex basic element 1200-1 is substantially similar to complex basic element 400 of FIG. 4. Complex basic element 1200-1, as pictured, may include a LUT 1205 and a flip-flop 1210. LUT 1215 receives signal 1215 as an input and signal 1220 as an input. Signal 1220 is output from flip-flop 1210. Flip-flop 1210 receives signal 1225, which is output from LUT 1205, as an input signal. Flip-flop 1210 further receives control signal 1230. Control signal 1230 may be a set signal.

As part of CSA, the system modifies complex basic element 1200-1 to generate modified complex basic element 1200-2. As pictured, an OR-circuit 1235 is inserted. Signal 1220 is provided to a first input pin of OR-circuit 1235. Control signal 1230 bypasses flip-flop 1210 and is provided to a second input pin of OR-circuit 1235. OR-circuit 1235 is inserted for purposes of illustration and analysis only. OR-circuit 1235 does not remain within the circuit design as discussed with reference to FIG. 11.

The output of OR-circuit is signal 1220', which is a modulated version of signal 1220, represents the final toggle rate of signal 1220. The final toggle rate of signal 1220 (the toggle rate of signal 1220') is a function of the toggle rate of signal 1230, the static probability of signal 1230, the initial toggle rate of signal 1220, and the static probability of signal 1220. Having determined the toggle rate of flip-flop 1210 when control signal 1230 is considered (i.e., the toggle rate of signal 1220'), signal 1225 as output from LUT 1205 may be revisited. The system may modulate signal 1225 from LUT 1205 based on the final toggle rate of signal 1220.

In accordance with the inventive arrangements described herein, complex basic elements may be formed within a circuit design. The complex basic elements, formed of two or more basic elements, may be analyzed using finite state machine analysis that differs from the analysis applied to basic element. The analysis may involve unrolling of a loop in the complex basic element to determine a static probability of the state line signal and a pre-pending operation to solve for the toggle rate of the complex basic element. A corrective phase may then be applied that accounts for control signals of the circuit design. Using the various techniques described herein may result in up to a 2× improvement in estimation accuracy of dynamic power dissipation of a circuit compared to other conventional techniques for vectorless dynamic power estimation.

The terminology used herein is for the purpose of describing particular aspects of the inventive arrangements and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a signal, a communication channel, a network, or a system.

As defined herein, the term "executable operation" is an operation performed by a data processing system or a processor within a data processing system. Examples of executable operations include, but are not limited to, "processing," "computing," "calculating," "determining," "displaying," "comparing," or the like. Such operations refer to actions and/or processes of the data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a controller, or the like.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein.

A method of vectorless dynamic power estimation for a circuit design may include forming, using a processor, a complex basic element within the circuit design, determining, using the processor, initial toggle rates for basic elements within the circuit design, and determining, using the processor, an initial toggle rate for the complex basic element. The method may include generating, using the processor, final toggle rates by updating the initial toggle rates according to a control signal analysis and calculating, using the processor, dynamic power dissipation for the circuit design using the final toggle rates.

The complex basic element may include a plurality of basic elements where at least two of the basic elements are coupled by a feedback path.

The method may include topologically sorting elements of the circuit design.

Determining an initial toggle rate for the complex basic elements may include determining a static probability of a state line signal of the complex basic element by unrolling the complex basic element and calculating the initial toggle rate of the complex basic element using the static probability of the state line signal by implementing a pre-pending operation on the complex basic element.

In one aspect, only a single pre-pending operation is performed.

Calculating final toggle rates may include adjusting the initial toggle rate of a selected basic element according to a static probability and toggle rate of a control signal coupled to the selected basic element.

Calculating final toggle rates also may include adjusting the initial toggle rate of the complex basic element according to a static probability and toggle rate of a control signal coupled to the complex basic element.

A system may include a processor programmed to initiate executable operations. The executable operations may include forming a complex basic element within the circuit design, determining initial toggle rates for basic elements within the circuit design, and determining an initial toggle rate for the complex basic element. The executable operations may include generating final toggle rates by updating the initial toggle rates according to a control signal analysis and calculating dynamic power dissipation for the circuit design using the final toggle rates.

The complex basic element may include a plurality of basic elements where at least two of the basic elements are coupled by a feedback path.

The processor may further be programmed to initiate executable operations that include topologically sorting elements of the circuit design.

Determining an initial toggle rate for the complex basic elements may include determining a static probability of a state line signal of the complex basic element by unrolling the complex basic element and calculating the initial toggle rate of the complex basic element using the static probability of the state line signal by implementing a pre-pending operation on the complex basic element.

In one aspect, only a single pre-pending operation is performed.

Calculating final toggle rates may include adjusting the initial toggle rate of a selected basic element according to a static probability and toggle rate of a control signal coupled to the selected basic element.

Calculating final toggle rates may also include adjusting the initial toggle rate of the complex basic element according to a static probability and toggle rate of a control signal coupled to the complex basic element.

A non-transitory computer-readable storage medium has instructions stored thereon. The instructions, when executed by a processor, perform a method. The method may include forming a complex basic element within the circuit design, determining initial toggle rates for basic elements within the circuit design, and determining an initial toggle rate for the complex basic element. The method may include generating final toggle rates by updating the initial toggle rates according to a control signal analysis and calculating dynamic power dissipation for the circuit design using the final toggle rates.

The complex basic element may include a plurality of basic elements where at least two of the basic elements are coupled by a feedback path.

The method also may include topologically sorting elements of the circuit design.

Determining an initial toggle rate for the complex basic elements may include determining a static probability of a state line signal of the complex basic element by unrolling the complex basic element and calculating the initial toggle rate of the complex basic element using the static probability of the state line signal by implementing a pre-pending operation on the complex basic element.

In one aspect, only a single pre-pending operation is performed.

Calculating final toggle rates may include adjusting the initial toggle rate of a selected basic element according to a static probability and toggle rate of a control signal coupled to the selected basic element and/or adjusting the initial toggle rate of the complex basic element according to a static probability and toggle rate of a control signal coupled to the complex basic element.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:

1. A method of vectorless dynamic power estimation for a circuit design, the method comprising:
   forming, using a processor, a complex basic element within the circuit design, wherein the complex basic element has a single input node and a single output node and comprises a plurality of basic elements where at least two of the basic elements are coupled by a feedback path;
   determining, using the processor, initial toggle rates for basic elements within the circuit design;
   determining, using the processor, an initial toggle rate for the complex basic element;
   generating, using the processor, final toggle rates by updating the initial toggle rates according to a control signal analysis; and
   calculating, using the processor, dynamic power dissipation for the circuit design using the final toggle rates;
   wherein the circuit design is configured for implementation within an integrated circuit.

2. The method of claim 1, wherein the initial toggle rates for the basic elements and the complex basic element are determined with control signals to the basic elements and the complex basic element disconnected.

3. The method of claim 1, further comprising:
   topologically sorting elements of the circuit design.

4. The method of claim 1, wherein determining an initial toggle rate for the complex basic element comprises:
   determining a static probability of a state line signal of the complex basic element by unrolling the feedback path of the complex basic element, wherein the state line signal is the feedback path; and
   calculating the initial toggle rate of the complex basic element using the static probability of the state line signal by implementing a pre-pending operation on the complex basic element.

5. The method of claim 4, wherein only a single pre-pending operation is performed.

6. The method of claim 1, wherein calculating final toggle rates comprises:
   adjusting the initial toggle rate of a selected basic element according to a static probability and toggle rate of a control signal coupled to the selected basic element.

7. The method of claim 6, wherein calculating final toggle rates comprises:
   adjusting the initial toggle rate of the complex basic element according to a static probability and toggle rate of a control signal coupled to the complex basic element.

8. A system, comprising:
   a processor programmed to initiate executable operations comprising:
   forming a complex basic element within the circuit design, wherein the complex basic element has a single input node and a single output node and comprises a plurality of basic elements where at least two of the basic elements are coupled by a feedback path;
   determining initial toggle rates for basic elements within the circuit design;
   determining an initial toggle rate for the complex basic element;
   generating final toggle rates by updating the initial toggle rates according to a control signal analysis; and calculating dynamic power dissipation for the circuit design using the final toggle rates;

wherein the circuit design is configured for implementation within an integrated circuit.

9. The system of claim 8, wherein the initial toggle rates for the basic elements and the complex basic element are determined with control signals to the basic elements and the complex basic element disconnected.

10. The system of claim 8, wherein the processor is further programmed to initiate executable operations comprising:

topologically sorting elements of the circuit design.

11. The system of claim 8, wherein determining an initial toggle rate for the complex basic element comprises:

determining a static probability of a state line signal of the complex basic element by unrolling the complex basic element; and calculating the initial toggle rate of the complex basic element using the static probability of the state line signal by implementing a pre-pending operation on the complex basic element.

12. The system of claim 11, wherein only a single pre-pending operation is performed.

13. The system of claim 8, wherein calculating final toggle rates comprises:

adjusting the initial toggle rate of a selected basic element according to a static probability and toggle rate of a control signal coupled to the selected basic element.

14. The system of claim 8, wherein calculating final toggle rates comprises:

adjusting the initial toggle rate of the complex basic element according to a static probability and toggle rate of a control signal coupled to the complex basic element.

15. A non-transitory computer-readable storage medium having instructions stored thereon which, when executed by a processor, perform a method comprising:

forming a complex basic element within the circuit design, wherein the complex basic element has a single input node and a single output node and comprises a plurality of basic elements where at least two of the basic elements are coupled by a feedback path;

determining initial toggle rates for basic elements within the circuit design;

determining an initial toggle rate for the complex basic element;

generating final toggle rates by updating the initial toggle rates according to a control signal analysis; and calculating dynamic power dissipation for the circuit design using the final toggle rates;

wherein the circuit design is configured for implementation within an integrated circuit.

16. The non-transitory computer-readable storage medium of claim 15, wherein the initial toggle rates for the basic elements and the complex basic element are determined with control signals to the basic elements and the complex basic element disconnected.

17. The non-transitory computer-readable storage medium of claim 15, further comprising:

topologically sorting elements of the circuit design.

18. The non-transitory computer-readable storage medium of claim 15, wherein determining an initial toggle rate for the complex basic element comprises:

determining a static probability of a state line signal of the complex basic element by unrolling the complex basic element; and calculating the initial toggle rate of the complex basic element using the static probability of the state line signal by implementing a pre-pending operation on the complex basic element.

19. The non-transitory computer-readable storage medium of claim 18, wherein only a single pre-pending operation is performed.

20. The non-transitory computer-readable storage medium of claim 15, wherein calculating final toggle rates comprises:

adjusting the initial toggle rate of a selected basic element according to a static probability and toggle rate of a control signal coupled to the selected basic element; or adjusting the initial toggle rate of the complex basic element according to a static probability and toggle rate of a control signal coupled to the complex basic element.

* * * * *